United States Patent
Wu et al.

(10) Patent No.: US 10,669,752 B2
(45) Date of Patent: Jun. 2, 2020

(54) ARMREST ASSEMBLY WITH LID WITH LATCH RELEASE HANDLE

(71) Applicant: Lear Corporation, Southfield, MI (US)

(72) Inventors: XiaoZhong Wu, Shanghai (CN); Ying Xue, Shanghai (CN); Min Gu, Shanghai (CN); Qian Zhu, Shanghai (CN); Mingzhe Zhao, Shanghai (CN)

(73) Assignee: Lear Corporation, Southfield, MI (US)

(*) Notice: Subject to any disclaimer, the term of this patent is extended or adjusted under 35 U.S.C. 154(b) by 268 days.

(21) Appl. No.: 15/848,671

(22) Filed: Dec. 20, 2017

(65) Prior Publication Data
US 2019/0186179 A1 Jun. 20, 2019

(51) Int. Cl.
*B60R 25/02* (2013.01)
*E05B 83/32* (2014.01)
(Continued)

(52) U.S. Cl.
CPC .............. *E05B 83/32* (2013.01); *B60N 2/793* (2018.02); *B60N 3/101* (2013.01); *B60R 7/00* (2013.01);
(Continued)

(58) Field of Classification Search
CPC ........ B60N 2/767; B60N 2/757; B60N 2/793; B60N 2/75; B60N 2/753; B60N 2/76; B60N 3/101; B60R 7/00; B60R 7/04; B60R 2011/0007; B60R 2011/0014; E05B 1/0038; E05B 17/0037; E05B 83/28; E05B 83/30; E05B 83/32; E05B 85/22; E05C 1/10; E05C 1/145; E05Y 2900/538; Y10S 292/37; Y10S 292/11; Y10S 292/04; Y10T 292/57; Y10T 292/096; Y10T 292/0969

USPC .......... 220/324, 326; 292/95, 163, 221, 170, 292/336.3, DIG. 31; 296/24.3, 24.34, 296/37.8; 297/188.19, 411.2; 70/398, 70/158

See application file for complete search history.

(56) References Cited

U.S. PATENT DOCUMENTS

| 4,218,598 A | 8/1980 | Iwasaki et al. |
| 4,834,681 A | 5/1989 | Chaillot |

(Continued)

FOREIGN PATENT DOCUMENTS

| DE | 202011108008 U1 | 1/2012 |
| KR | 2009040174 A | 4/2009 |
| WO | 1998006598 A1 | 2/1998 |

*Primary Examiner* — Gideon R Weinerth
(74) *Attorney, Agent, or Firm* — MacMillan, Sobanski & Todd, LLC

(57) ABSTRACT

An armrest assembly includes an armrest and a lid mounted on the armrest for relative rotational movement between a closed and open positions. The lid includes a handle cradle with handle guides on opposed sides and an intermediate inner guide. A handle is located in the handle cradle for relative movement between a latch position and a release position. The handle includes a latch. The latch retains the lid in the closed position when the handle is in the latch position. The handle includes a clip that engages a slot on the lid to retain the handle in the handle cradle. The handle also includes guide channels on opposed sides. The guide channels engage the handle guides. The handle includes an intermediate inner guide space. The inner guide space engages the inner guide. The armrest assembly also includes a spring that biases the handle into the latch position.

6 Claims, 5 Drawing Sheets

(51) Int. Cl.
  *B60N 2/75* (2018.01)
  *E05C 1/10* (2006.01)
  *B60R 7/00* (2006.01)
  *B60N 3/10* (2006.01)
  *E05B 1/00* (2006.01)

(52) U.S. Cl.
  CPC ............... *E05C 1/10* (2013.01); *B60N 2/757* (2018.02); *B60N 2/767* (2018.02); *E05B 1/0038* (2013.01); *E05Y 2900/538* (2013.01); *Y10T 292/096* (2015.04); *Y10T 292/0969* (2015.04)

(56) References Cited

U.S. PATENT DOCUMENTS

| | | | |
|---|---|---|---|
| 5,682,910 A | 11/1997 | Kizawa et al. | |
| 5,787,906 A | 8/1998 | D'Andrea | |
| 5,803,537 A * | 9/1998 | Langmeser | B60N 2/793 297/188.19 |
| 7,892,050 B2 | 2/2011 | Pavlovic et al. | |
| 8,304,101 B2 | 11/2012 | Ouyang | |
| 2004/0201238 A1 | 10/2004 | Griggs, Jr. et al. | |
| 2008/0100068 A1* | 5/2008 | Kim | B60N 3/083 292/163 |
| 2008/0122229 A1* | 5/2008 | Choi | B60R 7/04 292/216 |
| 2008/0129101 A1 | 6/2008 | Park | |
| 2008/0136193 A1* | 6/2008 | Oh | B60R 7/06 292/164 |
| 2009/0246610 A1* | 10/2009 | Shi | H01M 2/1066 429/100 |
| 2010/0151305 A1* | 6/2010 | Ouyang | E05B 17/0033 429/97 |
| 2010/0328858 A1* | 12/2010 | Xiong | H01M 2/1061 361/679.01 |
| 2015/0152671 A1* | 6/2015 | Nakasone | E05B 83/30 292/169 |
| 2018/0056882 A1* | 3/2018 | Osterhoff | B60N 2/682 |
| 2018/0194295 A1* | 7/2018 | Jones | B60R 7/04 |
| 2018/0274273 A1* | 9/2018 | Anderson | E05C 3/162 |
| 2018/0371808 A1* | 12/2018 | Yano | B60R 7/04 |
| 2019/0186179 A1* | 6/2019 | Wu | E05B 83/32 |

* cited by examiner

ARMREST ASSEMBLY WITH LID WITH LATCH RELEASE HANDLE

BACKGROUND OF THE INVENTION

This invention relates in general to an armrest storage assembly in an automobile. In particular, this invention relates to an improved lid latch for an armrest storage compartment.

Vehicles such as passenger cars commonly include armrests for the comfort of passengers. The rear seat in a passenger car will often be a bench seat that includes a center armrest located between two passenger seats. The armrest may be pivoted relative to the seat between a stowed position and a use position.

The center armrest may include additional comfort and convenience features for occupants of the vehicle. Some armrests include a storage compartment with a lid. The lid may be moved between a closed position and an open position, which allows the occupants to access the storage compartment. A latch is typically used to hold the lid in the closed position until released by the occupant, in order to prevent the lid from falling open with the armrest is moved between the stowed and use position. It would be advantageous to have an alternative lid latch for use with an armrest.

SUMMARY OF THE INVENTION

The invention relates to an armrest assembly. The armrest assembly includes an armrest. A lid is mounted on the armrest for relative rotational movement between a closed position and an open position. The lid includes a handle cradle. The handle cradle includes handle guides on opposed sides. The handle cradle also includes an intermediate inner guide. A handle is located in the handle cradle for relative movement between a latch position and a release position. The handle includes a latch. The latch retains the lid in the closed position when the handle is in the latch position. The handle includes a clip that engages a slot on the lid to retain the handle in the handle cradle. The handle also includes guide channels on opposed sides. The guide channels engage the handle guides. The handle includes an intermediate inner guide space. The inner guide space engages the inner guide. The armrest assembly also includes a spring that biases the handle into the latch position.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
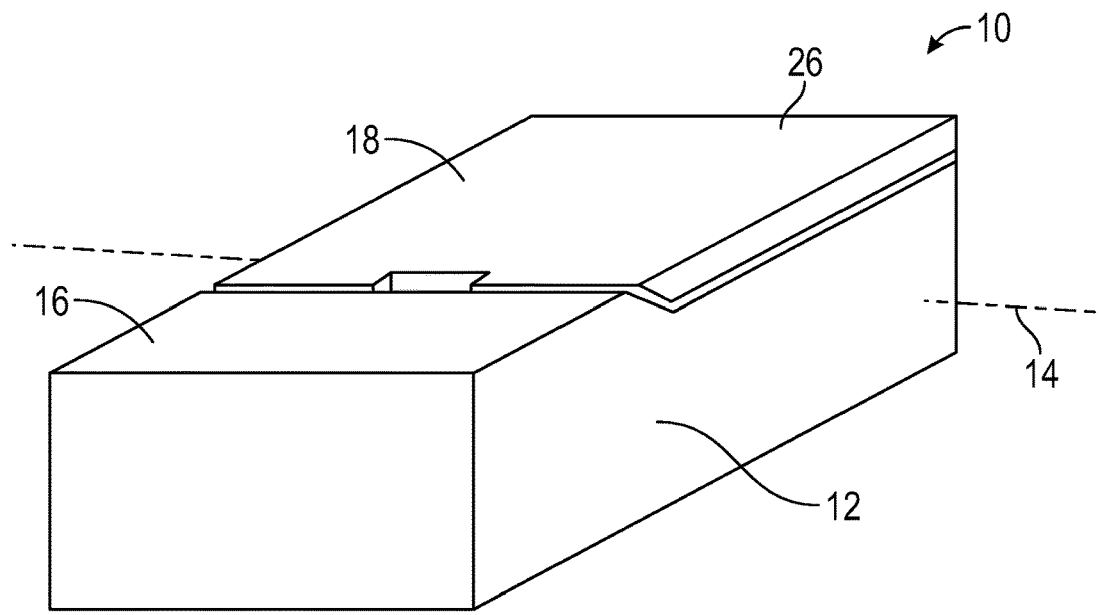
FIG. 1 is a perspective view of a prior art armrest including an attached lid shown in a closed position.
Figure 2:
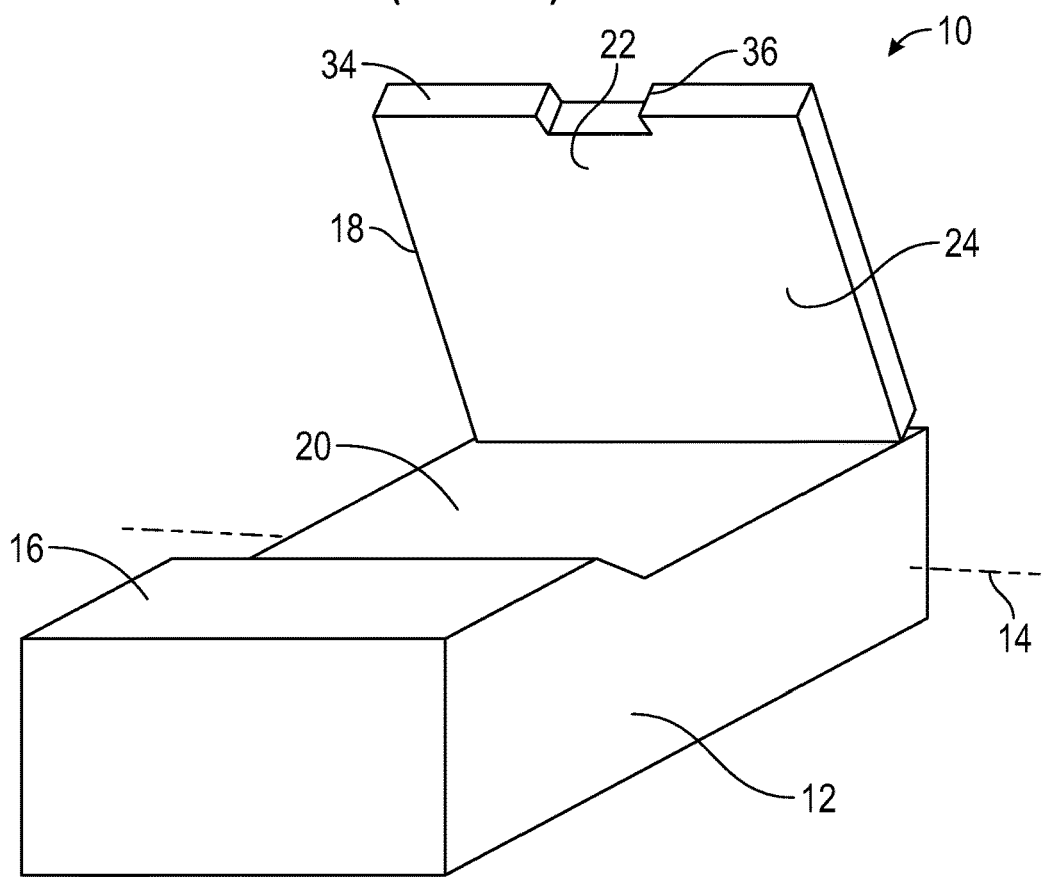
FIG. 2 is a view similar to FIG. 1, showing the lid in an open position.

Referring now to the drawings, there is illustrated in FIG. 1 a perspective view of a prior art armrest assembly, indicated generally at 10. The armrest assembly 10 includes an armrest 12 and is adapted to be mounted relative to a vehicle bench seat (not shown) for relative rotation about a hinge axis 14. The armrest 12 includes a trim 16 and is normally mounted in the center of the bench seat for the use by occupants of the bench seat. The armrest assembly 10 includes a prior art lid 18 that is mounted on the armrest 12 for relative rotation. The prior art lid 18 is shown in a closed position in FIG. 1, and is shown in an open position in FIG. 2. When the prior art lid 18 is in the open position, a storage compartment 20 is accessible by the occupants. The armrest assembly 10 includes a latch 22 that retains the prior art lid 18 in the closed position relative to the armrest 12. This allows the armrest 12 to be moved about the hinge axis 14 while retaining objects in the storage compartment 20. The latch 22 may be moved from a latch position to a release position by the occupants in order to move the prior art lid 18 from the closed position to the open positon.

Figure 3:
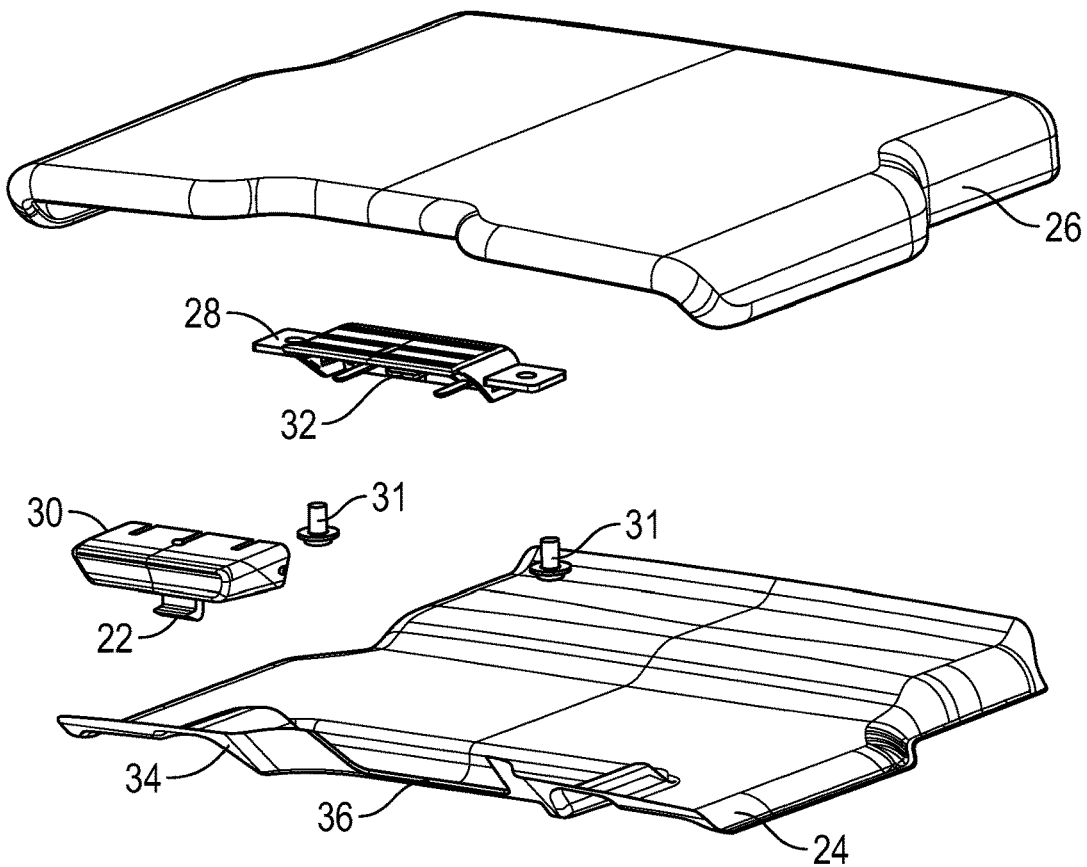
FIG. 3 is an exploded view of the lid from FIG. 1.

Referring to FIG. 3, there is shown an exploded view of the prior art lid 18. The prior art lid 18 includes a lid base 24, a lid trim 26, a housing 28, and a handle 30. The lid base 24 is made of plastic, defines a generally flat shape and is contoured to fit on the armrest 12 over the storage compartment 20. The lid trim 26 is made of plastic and includes a finished surface that is visible to the occupants when the prior art lid 18 is in the closed position. The housing 28 is made of plastic and is mounted to the lid trim 26 using two screws 31. The housing 28 serves to position the handle 30 on the prior art lid 18, as will be described below.

Figure 4:
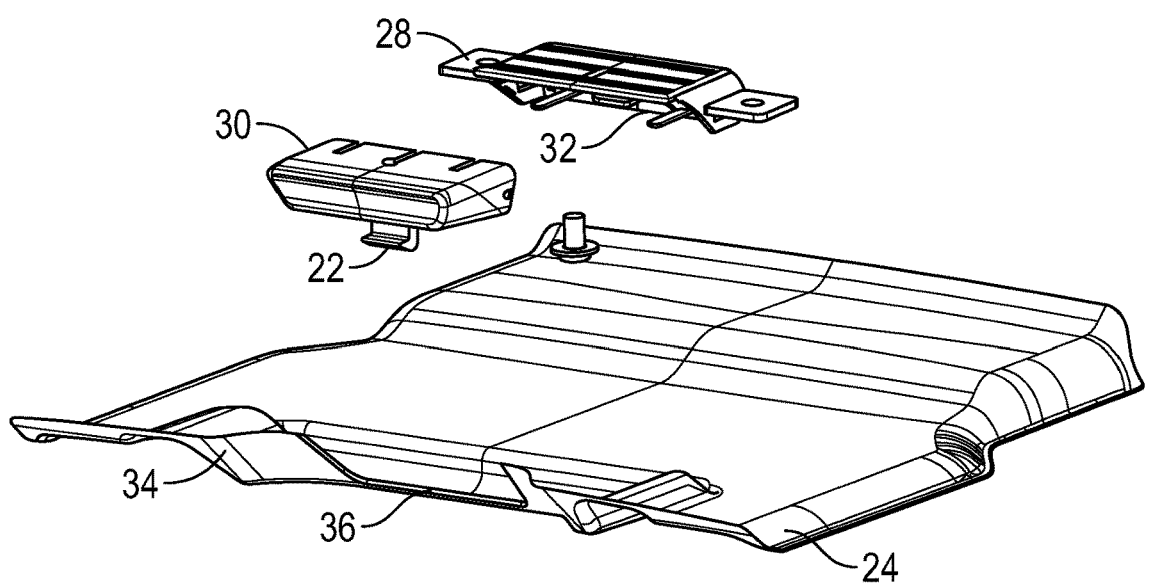
FIG. 4 is an enlarged, view of portions of the lid from FIG. 3.

Referring to FIG. 4, there is illustrated an enlarged, detail view of a portion of the prior art lid 18. The housing 28 includes a handle cradle 32, which the handle 30 fits into. To assemble the prior art lid 18, the housing 28 is attached to the lid trim 26 using the screws 31. The handle 30 is inserted into the handle cradle 32 with a spring (not shown) located in the handle cradle 32 to bias the handle 30 toward the latch position. The lid trim 26 is then attached to the lid base 24 so that the housing 28 and the handle 30 are located between the lid base 24 and the lid trim 26. The lid base 24 is attached to the lid trim 26 using clips (not shown). The lid base 24 includes a stop wall 34, and the handle 30 is trapped between the housing 28 and the stop wall 34. The stop wall 34 includes a wall opening 36 located in the center of the stop wall 34. The latch 22 extends from the handle 30 through the wall opening 36, and the handle 30 is biased toward the wall opening 36. In order to move the handle 30 to the release position, the occupant can push the handle 30 toward the housing 28 and away from the wall opening 36, against the force of the spring.

Figure 5:
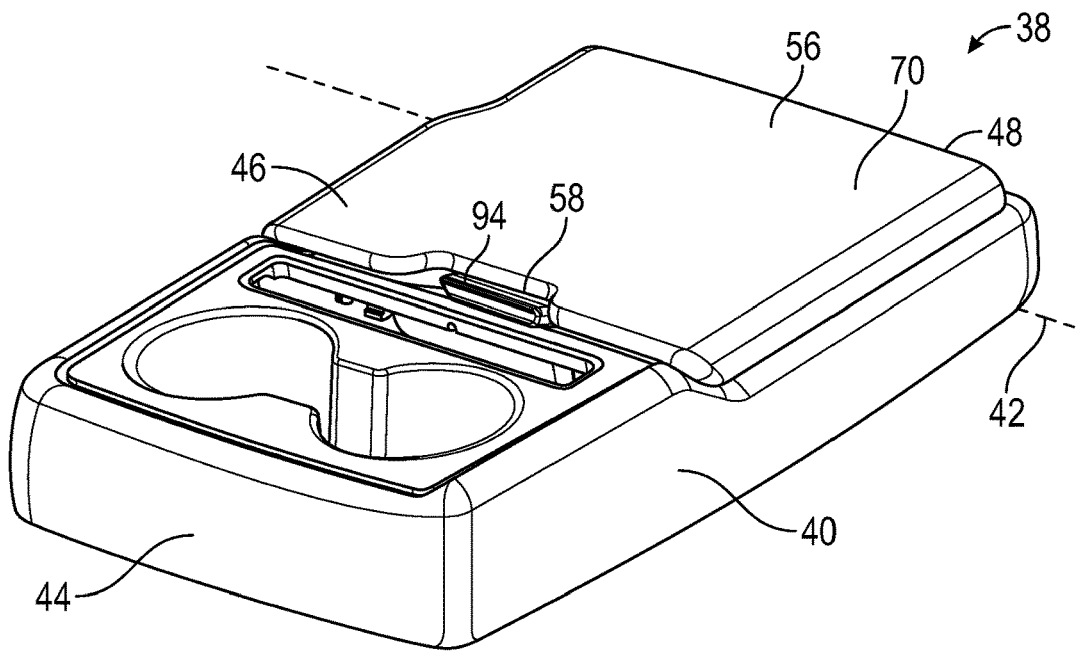
FIG. 5 is a perspective view of an armrest including an attached lid in accordance with this invention, shown in a closed position.

Referring now to FIG. 5, there is illustrated a perspective view of an armrest assembly, indicated generally at 38. The armrest assembly 38 includes an armrest 40 and is adapted to be mounted relative to a vehicle bench seat (not shown) for relative rotation about a hinge axis 42. The armrest 40 includes a trim 44 and is normally mounted in the center of the bench seat for the use by the occupants. The armrest assembly 38 includes a lid 46 in accordance with this invention. The lid 46 includes a hinge 48 and is mounted on the armrest 40 for relative rotation between a closed position, shown in FIG. 5, and an open position, shown in FIG.

6. When the lid 46 is in the open position, a storage compartment 50 is accessible by the occupants. The armrest assembly 38 includes a latch 52 that retains the lid 46 in the closed position relative to the armrest 40. This allows the armrest 40 to be moved about the hinge axis 42 while retaining objects in the storage compartment 50. The latch 52 may be moved from a latch position to a release position by the occupants in order to move the lid 46 from the closed position to the open positon.

Figure 7:
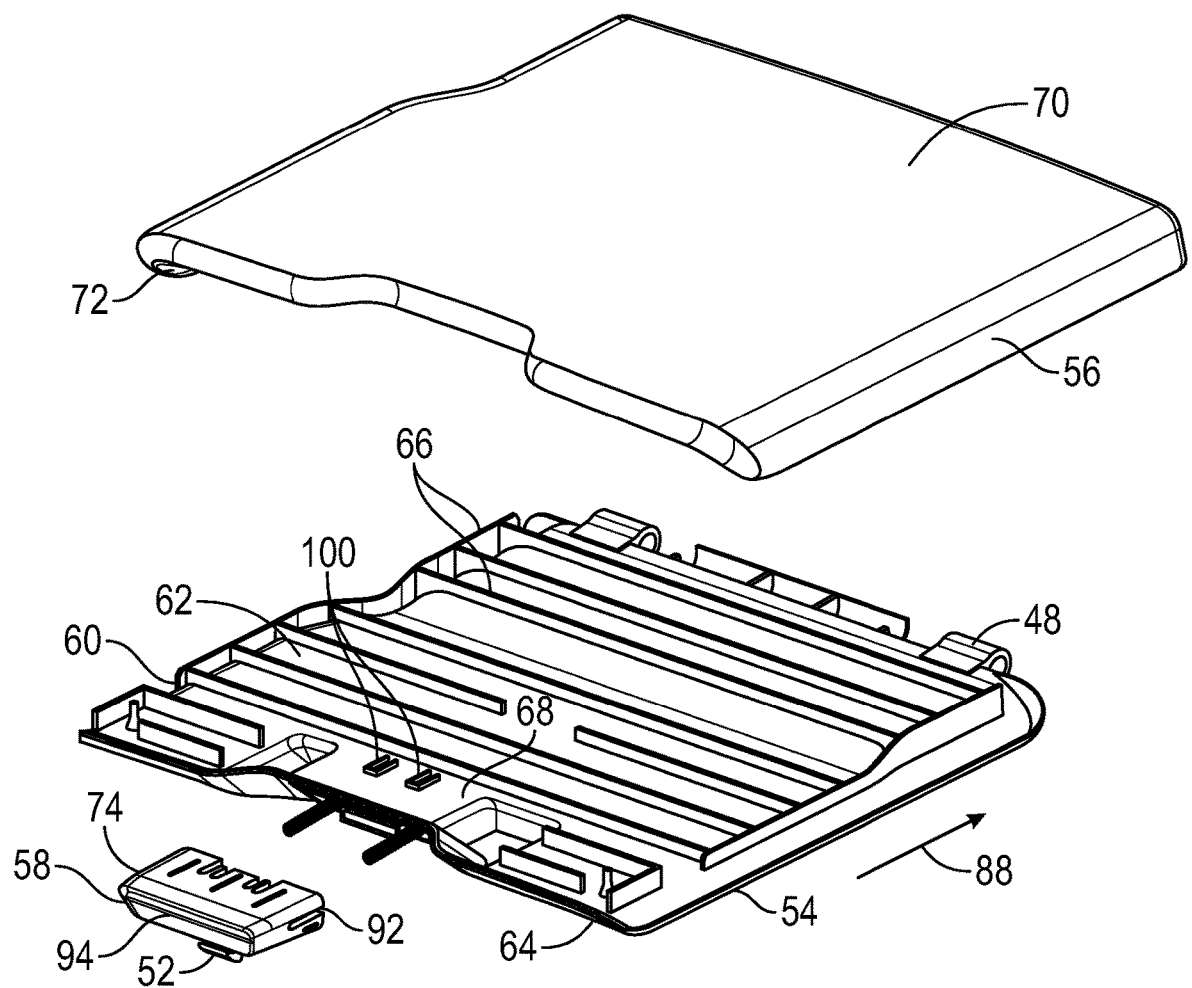
FIG. 7 is an exploded view of the lid from FIG. 5.

Referring to FIG. 7, there is shown an exploded view of the lid 46. The lid 46 includes a lid base 54, a lid trim 56, and a handle 58. The lid base 54 is made of plastic and includes a substantially flat, square-shaped base body 60. The lid base 54 includes an inner face 62 and an opposed outer face 64. The outer face 64 faces the storage compartment 50 when the lid 46 is in the closed position, and is the side of the lid base 54 that is visible to the occupants when the lid 46 is assembled. The inner face 62 includes a plurality of raised walls 66 that extend generally perpendicular to the inner face 62. The purpose of the raised walls 66 will be described below. The lid 46 also includes a handle retainer 68. The illustrated handle retainer 68 is molded as part of the lid base 54 and is located on the inner face 62 of the lid base 54, but may be on any desired part of the lid 46. The handle retainer 68 will be described in greater detail below. The illustrated lid trim 56 is made of plastic, but may be made of any desired material. The lid trim 56 includes an outer trim face 70 and an opposed inner face 72. The trim face 70 is normally visible to the occupants when the lid 46 is assembled.

To assemble the illustrated lid 46, the lid trim 56 is positioned with the inner face 72 facing the lid base 54 so that the raised walls 66 on the lid base 54 are in contact with the inner face 72. The illustrated lid trim 56 and the lid base 54 are then hot plate welded, so that a portion of the material melts and then sets, bonding the lid trim 56 and the lid base 54 together. However, the lid trim 56 and the lid base 54 may be connected together using any desired connector. The handle 58 is then inserted into the handle retainer 68, as will be described below.

Figure 8:
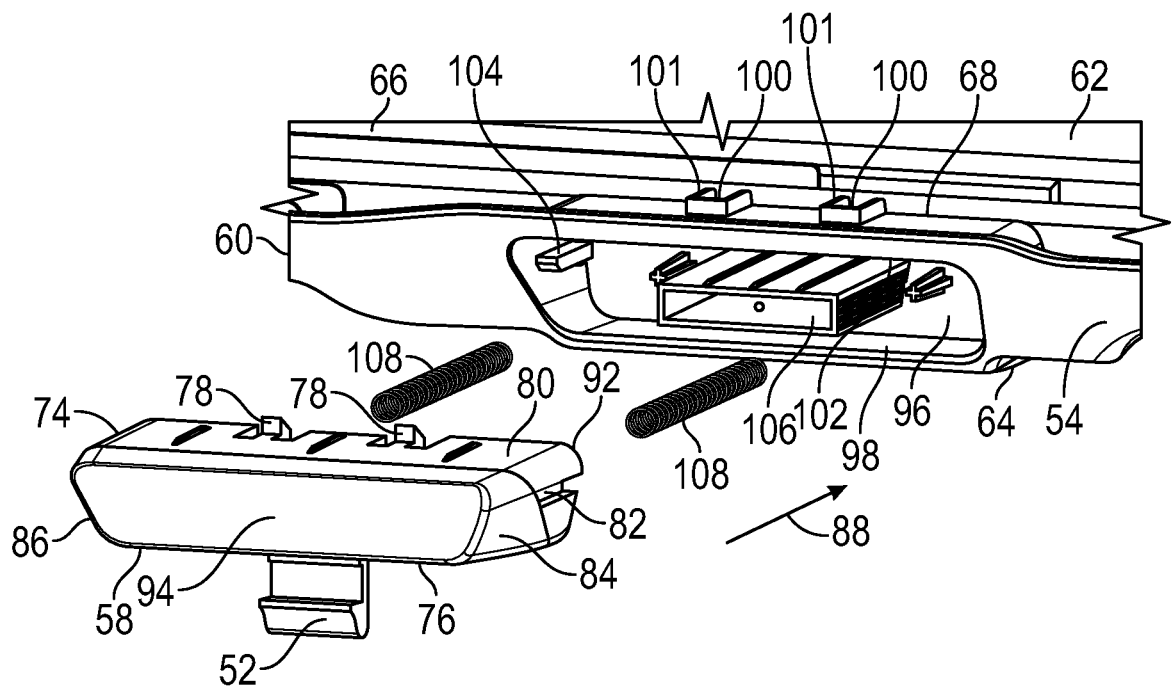
FIG. 8 is an enlarged, detail view of portions of the lid from FIG. 7, including a handle.
Figure 9:
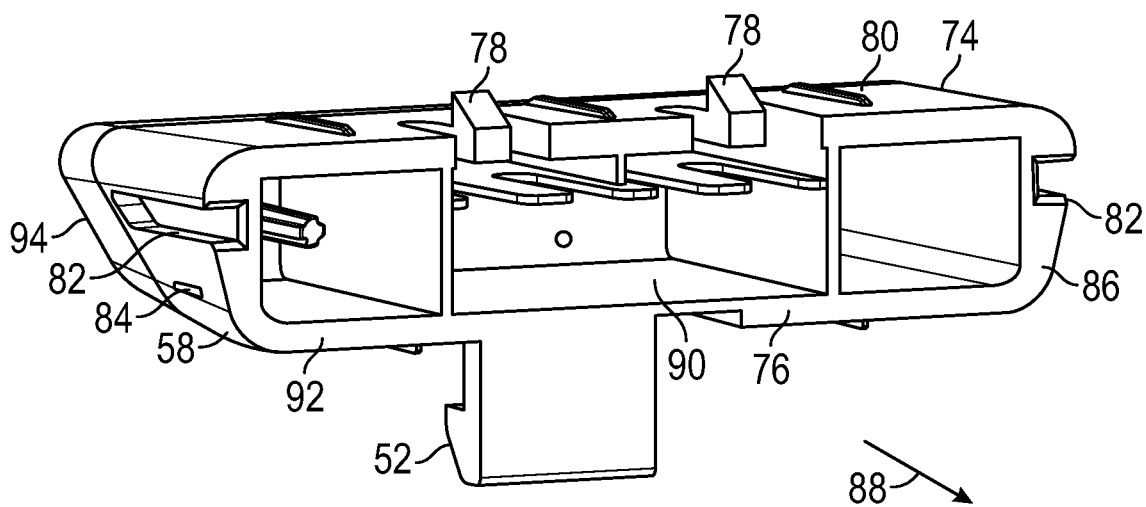
FIG. 9 is a perspective view of the handle, from behind.

Referring to FIG. 8, there is shown an enlarged, detail view of the handle 58 and the portion of the lid base 54 including the handle retainer 68. FIG. 9 shows a perspective view of the handle 58 from behind. The features of the handle 58 and the handle retainer 68 will be described in reference to these two figures. The illustrated handle 58 is molded from plastic, but may be made of any desired material using any desired process. The handle 58 includes a handle base 74, and the latch 52 extends from a first side 76 of the handle base 74. The handle 58 includes a plurality of handle clips 78 that extend from a second side 80 of the handle base 74. In the illustrated embodiment, the second side 80 is opposed to the first side 76. Also, the illustrated handle 58 includes two handle clips 78, each handle clip 78 being a resilient arm with a tab on an outer end thereof. The handle clips 78 serve to retain the handle 58 in the handle retainer 68, as will be described below.

The handle 58 includes two guide channels 82 respectively provided on a third side 84 and a fourth side 86. The guide channels 82 extend generally parallel to an insertion direction 88 and serve to keep the handle 58 properly oriented relative to the handle retainer 68, as will be described below. The handle base 74 includes a guide space 90 on an insertion end 92. The guide space 90 also serves to keep the handle 58 properly oriented relative to the handle retainer 68. The handle 58 also includes a contact surface 94 on an end opposite the insertion end 92. The contact surface 94 is exposed for the occupant to press to move the latch 52 to the release position when the lid 46 is assembled, as will be described below.

As seen in FIG. 8, the handle retainer 68 includes a handle cradle 96. The handle cradle 96 is a space that is sized and shaped to accommodate the handle 58. The handle cradle 96 is shortened on a first side 98, to accommodate the latch 52 on the handle 58. The handle retainer 68 includes a plurality of slots 100 located on a second side 102 of the handle cradle 96. The slots 100 are openings in the second side 102 of the handle cradle 96 that accommodate the tabs on the handle clips 78 when the handle 58 is inserted into the handle cradle 96. The lid 46 includes guard walls 101 located around the slots 100 outside the handle cradle 96. As previously described, the illustrated lid trim 56 and the lid base 54 are connected together by welding, and the guard walls 101 prevent melt material from flowing through the slots 100 and into the handle cradle 96.

The handle retainer 68 includes a plurality of handle guides 104 located in the handle cradle 96. The illustrated handle retainer 68 includes two handle guides 104 that are raised projections within the handle cradle 96 that extend generally parallel to the insertion direction 88. When the handle 58 is inserted into the handle cradle 96, one handle guide 104 is located in each guide channel 82. The handle retainer 68 includes an inner guide 106 that extends into the handle cradle 96 generally parallel to the insertion direction 88. When the handle 58 is inserted into the handle cradle 96, the inner guide 106 is located in the guide space 90.

As previously described, the handle 58 can be mated with the handle retainer 68 after the lid base 54 is attached to the lid trim 56. In the illustrated embodiment, two springs 108, shown in FIG. 8, are placed in the handle cradle 96 and engage the handle retainer 68 and the handle 58. The springs 108 bias the handle 58 out of the handle cradle 96. The insertion end 92 of the handle 58 is inserted into the handle cradle 96 and the handle 58 is moved in the insertion direction 88. As previously described, the inner guide 106 in the handle retainer 68 enters the guide space 90 in the handle 58, and the handle guides 104 in the handle retainer 68 enter the guide channels 82 on the handle 58. As a result, the handle 58 is limited to moving in the directions parallel to the insertion direction 88.

During the initial insertion of the handle 58 into the handle cradle 96, the handle clips 78 will engage and deflect away from the second side 102 of the handle cradle 96. When the handle 58 is inserted farther into the handle cradle 96, the handle clips 78 will rebound and enter the slots 100 in the handle cradle 96. The handle 58 is then retained in the handle retainer 68 by the handle clips 78. The handle 58 is biased out of the handle cradle 96 by the springs 108, but the handle clips 78 engage the lid base 54 and keep the handle 58 in the handle cradle 96.

Figure 6:
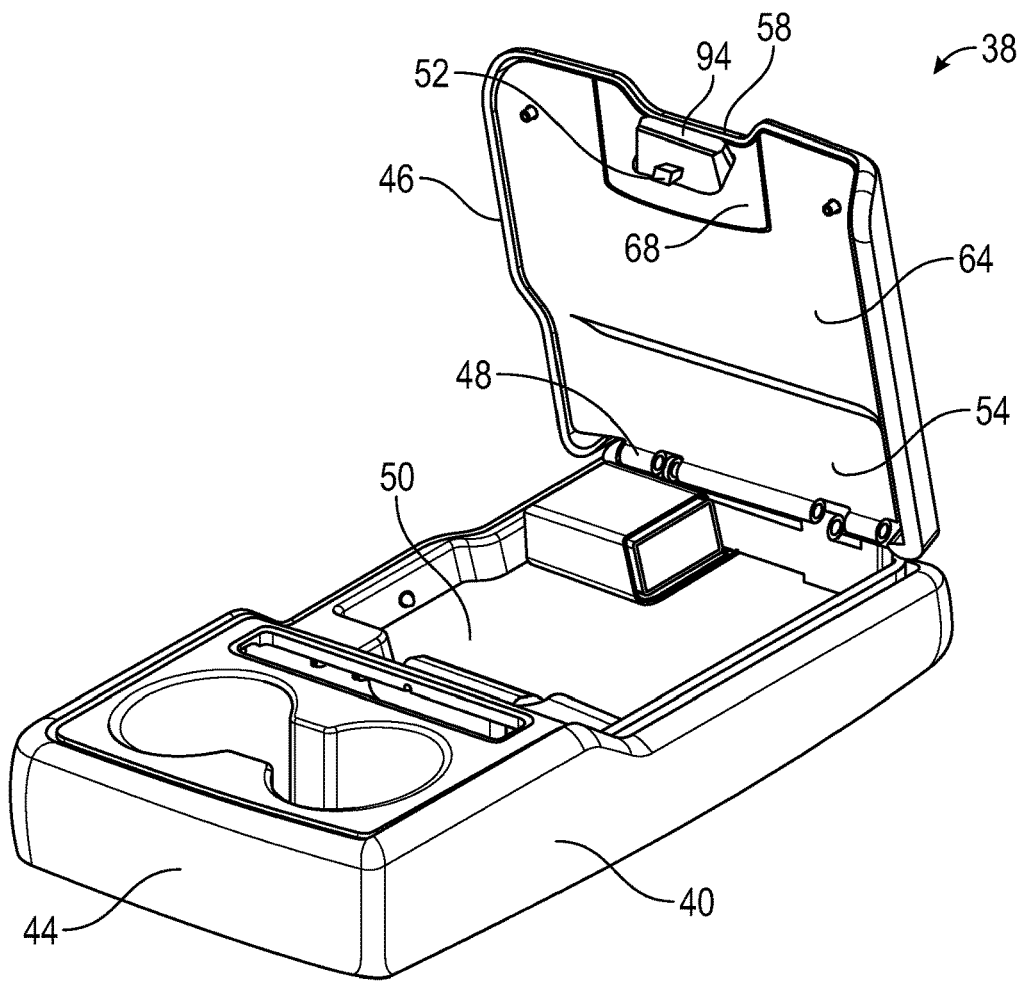
FIG. 6 is a view similar to FIG. 5, with the lid shown in an open position.

Referring back to FIG. 6, the handle 58 is retained in the handle retainer 68 and remains in a retained position. When the lid 46 is moved toward the closed position, the latch 52 will engage the armrest 40 and will deflect the handle 58, against the force of the springs 108, to the release position. When the lid 46 is moved fully to the closed position, shown in FIG. 5, the springs 108 will bias the handle 58 into the latch position. When the occupant desires to access the storage compartment 50, they press the contact surface 94 of the handle 58 and move the handle 58 against the force of the springs 108 to the release position. The guide channels 82 and the guide space 90 on the handle 58 cooperate with the handle guides 104 and the inner guide 106 on the handle retainer 68 to keep the handle 58 properly oriented relative to the lid base 54. Additionally, the two springs 108 provide a biasing force on the handle 58 that is distributed across the width of the handle 58. As a result, the occupant may push on one side of the contact surface 94 and the handle 58 will move parallel to the insertion direction 88 without turning and getting stuck in the handle cradle 96.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest assembly comprising:
   an armrest;
   a lid mounted on the armrest for relative rotational movement between a closed position and an open position, the lid including a handle cradle that includes handle guides on opposed sides and an intermediate inner guide;
   a handle located in the handle cradle for relative movement between a latch position and a release position, the handle including a latch that retains the lid in the closed position when the handle is in the latch position, a clip that engages a slot on the lid to retain the handle in the handle cradle, guide channels on opposed sides of the handle that engage the handle guides and an intermediate inner guide space that engages the inner guide; and
   a spring that biases the handle into the latch position.

2. The armrest assembly of claim 1, wherein the slot in the handle cradle extends from a side of the handle cradle to an inner face of the lid, and the lid includes raised guard walls on the inner face around the slot.

3. The armrest assembly of claim 1, the lid including a lid base and a lid trim, wherein the handle cradle is attached to the lid base between the lid base and the lid trim.

4. The armrest assembly of claim 3, the lid including a plurality of raised walls located between an inner face of the lid base and an inner face of the lid trim.

5. The armrest assembly of claim 4, wherein the slot in the handle cradle extends from a side of the handle cradle to the inner face of the lid base, and the lid base includes raised guard walls on the inner face around the slot.

6. The armrest assembly of claim 5, further comprising a second spring that biases the handle into the latch position, wherein the spring and the second spring are located on opposed sides of the inner guide.

* * * * *